Dec. 5, 1967     L. S. SMITH     3,356,936
METHOD AND MEANS FOR TOTAL BATTERY VOLTAGE TESTING
Filed Feb. 12, 1964
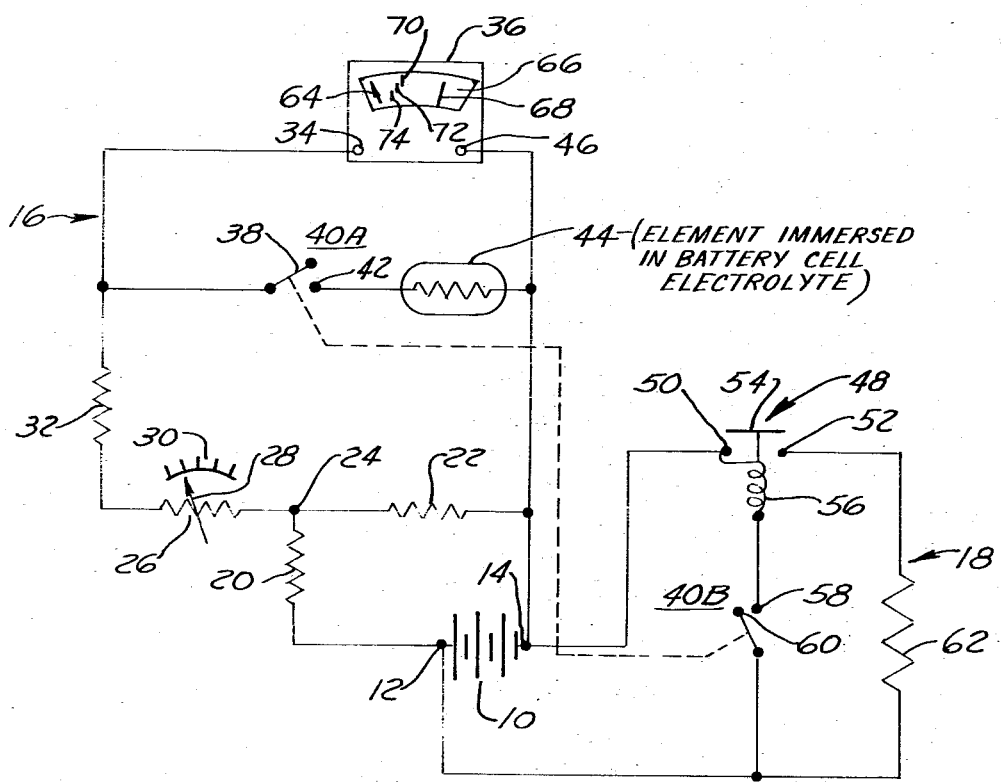
INVENTOR.
LEONARD S. SMITH
BY Bair, Freeman
& Molinare, ATTORNEYS

United States Patent Office 3,356,936
Patented Dec. 5, 1967

3,356,936
METHOD AND MEANS FOR TOTAL BATTERY VOLTAGE TESTING
Leonard S. Smith, Minneapolis, Minn., assignor, by mesne assignments, to Litton Precision Products, Inc., Beverly Hills, Calif., a corporation of Delaware
Filed Feb. 12, 1964, Ser. No. 344,344
8 Claims. (Cl. 324—29.5)

ABSTRACT OF THE DISCLOSURE

Apparatus for detecting faulty storage batteries includes a no load circuit having a series connected rheostat and voltmeter combination connected to the battery terminals. The state of charge of the battery is determined prior to the testing by adjusting the rheostat so that the voltmeter needle indicates a predetermined reading.

The battery is tested by connecting a load circuit across the battery terminals and by connecting in parallel with the voltmeter a temperature sensitive element immersed in the battery cell electrolyte. The voltmeter scale is calibrated so that a faulty storage battery is detected by observing an excessive amount of deflection of the voltmeter needle during the test.

---

This invention relates generally to the testing of storage batteries, and more particularly, to new and improved method and means for detecting faulty storage batteries at various states of charge by measuring total battery voltage.

Those skilled in the art appreciate that the testing of storage batteries by measuring total battery voltage under load always has been beset by a number of problems. These problems have arisen, for example, because such a test without the battery being in a state of full charge was meaningless. Further, the battery size and the temperature must be taken into consideration, and unless they were compensated for during the test, the accuracy of the result would be affected.

It has been possible, under laboratory conditions and with a great deal of necessary equipment, to conduct such tests with accurate and satisfactory results. However, under normal conditions involving the testing of an automobile battery installed in an automobile, neither the personnel nor the equipment of the type required can be supplied by the average service station.

At the present time, there are many types of battery testing equipment available to the service station operator. These include the conventional total battery voltage load tester which requires that the battery under test be fully charged; otherwise additional delay and equipment are necessary. The total battery voltage testers, either open circuit or under load, generally lack in one or more of the necessary prerequisites for accurate analysis of the battery, or they are difficult or impractical to use due to the need for supplementary equipment or undue preparation of the battery to be tested.

Further, equipment of the type using cell voltage comparisons, either open circuit or under load, are fast becoming impractical due to the inaccessibility of the intercell connectors on modern batteries.

Accordingly, it is a general object of this invention to provide a new and improved total battery voltage tester which overcomes the above-described liabilities of the prior art testing systems.

It is a more specific object of this invention to provide a new and improved method and means for total voltage battery testing which eliminates the need for having the battery fully charged before testing.

It is another object of this invention to provide a new and improved method and means for total voltage battery testing which eliminates the need for making separate compensating adjustments for battery temperature.

It is still another object of this invention to provide a new and improved method and means for total voltage battery testing which eliminates the need for making separate compensating adjustments for battery size.

It is a further object of this invention to provide a unique method for total battery voltage testing which comprises the steps of connecting a no-load circuit including a variable resistance and a voltmeter to the battery terminals, selectively adjusting the variable resistance to obtain a predetermined reading on the voltmeter, connecting a predetermined load to the battery terminals, connecting a temperature sensitive element located in the electrolyte of one cell of the battery in circuit with the voltmeter while the load is connected to the battery to automatically compensate the voltmeter reading for battery temperature, and causing the voltmeter reading to change by an amount no more than a predetermined value if the battery under test is good and to change by an amount greater than said predetermined value if the battery is faulty, wherein the predetermined value is dependent upon the size of the battery under test.

It is a still further object of this invention to provide novel apparatus for detecting faulty storage batteries by measuring total battery voltage which comprises a no-load circuit including resistance means and a voltmeter connected to the battery terminals; means to selectively vary the resistance of said resistance means to prepare the voltmeter reading for the battery test; a battery load adapted to be connected to the battery by the closure of a normally open switch, a temperature sensitive element operatively associated with the battery under test; and switch means for connecting the temperature sensitive element to the voltmeter when the battery is placed under load to automatically compensate the voltmeter reading for battery temperature during the battery testing operation.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which:

The single figure of the drawing is an illustrative schematic circuit diagram of a novel battery testing apparatus capable of carrying out applicant's new method steps for detecting faulty storage batteries at various states of charge by measuring total battery voltage.

Referring now to the drawing, there is shown a storage battery 10 to be tested. The storage battery 10 is provided with the terminals 12 and 14, to which a no-load circuit 16 and a load circuit 18 are adapted to be connected in the operation of the invention.

The no-load circuit 16 advantageously comprises a voltage divider network which may include the fixed resistors 20 and 22, each respectively connected at one end thereof to the battery terminals 12 and 14 and connected together at their other ends to the junction point 24.

The junction point 24 is connected to a rheostat or other type of selectively variable resistance. Advantageously, the resistance value of the rheostat 26 may be varied, as desired, by means of a control knob 28 which is accessible to the operator for manual operation. The position of the control knob 28, and therefore the relative resistance value of the rheostat 26, may be indicated by means of a suitable indicating scale 30 positioned adjacent a pointer on the control knob 28.

The rheostat 26 is connected through a fixed voltmeter range resistor 32 to one terminal 34 of an indicating voltmeter 36. The fixed resistor 32 also is connected to a contact arm 38 of a normally open momentary switch 40A, the other contact 42 of which is connected to a temperature sensitive element 44, such as a thermistor or the like.

The other terminal 46 of the indicating voltmeter 36, and the other end of the thermistor 44, are connected to the battery terminal 14 for completing the circuit connections of the no-load circuit 16.

The load element 62 of load circuit 18 is adapted to be connected to the terminals of storage battery 10 by means of a normally open high-current load switch 48, which advantageously may be of the automotive solenoid type. The high-current load switch 48 is comprised of a first fixed contact 50 connected to the storage battery terminal 14, a solenoid actuated armature contact 54 and a second fixed contact 52. Contact 52 is connected through the load element 62 back to battery terminal 12. The solenoid armature contact 54 of the high-current load switch 48 is adapted to be actuated upon energization of the solenoid coil 56 operatively associated therewith. One terminal of the solenoid coil 56 is connected to the switch contact 50 and the other of its terminals is connected to a fixed contact 58 of the normally open momentary switch 40B. The contact arm 60 of the momentary switch 40B is connected to the battery terminal 12.

In accordance with the operation of the present invention, as described in greater detail hereinbelow, the contact arms 38 and 60 of the momentary switches 40A and 40B are ganged together for mutual operation in response to a momentary actuation by the operator. Thus, the closure of the contact arms 38 and 60 of momentary switches 40A and 40B, respectively, serve to initiate the battery testing operation. The closure of the contacts in switch 40A places the temperature sensitive element or thermistor 44 into the voltmeter circuit while the closure of the contacts of momentary switch 40B serves to energize the solenoid coil 56. The energization of coil 56 serves to actuate the armature contact 54 of the high-current switch 48 and close the circuit between the battery terminals and the load element 62.

The operation of the invention now will be described. The resistance values of the resistors 20 and 22 in the voltage divider across the battery to be tested advantageously are selected so that the current drain through these resistors does not drop the battery voltage appreciably below its open circuit value. Preferably, this current drain should not exceed approximately .10 ampere. Before the switches 40A and 40B are closed, the control knob 28 on the rheostat 26 is adjusted so that the reading of the indicating needle 64 of the voltmeter 36 is set to a preselected point on the voltmeter scale 66. Advantageously, this preselected point on the scale may be the indicia marker or line 68.

The momentary switches 40A and 40B then are closed to respectively place the thermistor 44 and the load element 62 in circuit with the battery to be tested. A voltage drop will take place due to the addition of the load element 62 across the battery 10, and this voltage drop will be shown on the voltmeter scale 66 by the movement of the indicating needle 64 from the preselected indicia line 68.

In accordance with a feature of this invention, the amount of voltage drop from line 68 shown on the voltmeter scale 66 will not exceed a predetermined amount if the battery 10 is not faulty and the voltage drop will exceed this predetermined amount if the battery 10 is defective. The predetermined amount of voltage drop used as the reference in this determination will vary in accordance with the size of the battery being tested. For this purpose, the voltmeter scale 66 is provided with a plurality of separate marks or indicia, each associated with a separate and different battery size. In the exemplary embodiment shown, three such marks, 70, 72 and 74, are illustrated to enable the illustrated voltmeter to be utilized in testing batteries of three different sizes. However, it is understood that any number of marks desired may be used depending upon the number of different size batteries to be tested.

If, for example, the battery 10 being tested is of the size associated with the mark 70 on the voltmeter scale 66, any drop in the voltmeter reading greater than the distance between the scale marks 68 and 70 will indicate a faulty or defective battery. Conversely, if the meter reading drops by an amount equal to or less than this predetermined amount, the battery 10 will be indicated as acceptable.

Advantageously, the range of the rheostat 26 and the resistance values of the resistors 20 and 22 in the voltage divider are chosen such that any battery down to approximately 25% of its full charge can be tested. If the battery to be tested is in such a low state of charge (less than 25% of full charge) that the indicating needle 64 cannot be adjusted by the rheostat 26 to the voltmeter line 68, as described above, then the need for a battery recharge is clearly indicated before the test can be conducted.

In accordance with a still further feature of this invention, the temperature sensitive element or thermistor 44 is of such a size that it can be housed in a suitable container placed in the electrolyte of one cell of the storage battery 10 to be tested. Since the temperature sensitive element 44 is placed into the voltmeter circuit when the testing operation is initiated, the temperature sensitive element 44 serves to automatically compensate the voltmeter reading with respect to the battery temperature.

Those skilled in the art now can appreciate the several novel and highly advantageous features of the present invention. First, correction for the state of charge of the battery 10 to be tested is automatically made for when the voltmeter reading is adjusted by means of the rheostat 26. Advantageously, the position of the control knob 28 on the indicating scale 30 of the rheostat 26 serves to indicate the relative state of charge of the battery under test. This information can be utilized directly in recharging or servicing of the battery when necessary.

In addition, through the use of the temperature sensitive element 44 in the electrolyte of one of the battery cells, and through the use of an indicating scale 66 on the meter 36, carrying the indicia 70, 72 and 74 denoting various battery sizes, the temperature and the size of the battery under test also are automatically compensated for during the test. It has been found that storage batteries in a state of charge down to about 25% of their full charge capacity can be accurately tested by the use of the inventive apparatus and method.

Those skilled in the art will further recognize that the determining factor in the use of the invention is the battery voltage difference between the meter indicated open circuit value and the meter indicated value under a given load. On a good battery, this difference is a relatively constant quantity which is related to battery size, but is independent of battery state of charge down to approximately 25% of full charge. In accordance with the present invention, this is attained by the voltmeter adjustment through the rheostat 26, setting the battery state of charge in the open circuit condition to a preselected point 68 on the voltmeter scale 66, and relating the difference voltage to another predetermined point on the meter scale when the switch 40 is operated. As explained above, the voltage reading at this predetermined point also is automatically adjusted for the battery temperature, by the temperature sensitive element 44 placed in the electrolyte of one cell of the battery.

While there has been shown and described a specific embodiment of the present invention, it will, of course, be understood that various modifications and alternative constructions may be made without departing from the true spirit and scope of the invention. Therefore, it is intended by the appended claims to cover all such modi-

What is claimed as the invention is:

1. The improved method for detecting faulty storage batteries at various states of charge by measuring total battery voltage comprising the steps of connecting a no-load, high resistance, low current circuit including a selectively variable resistance in series with a voltmeter across the terminals of the battery under test; selectively adjusting said variable resistance to obtain a predetermined reading on the voltmeter; the adjusted position of said variable resistance indicating the relative state of charge of the battery under test; closing a switch to connect a load of predetermined magnitude to the battery under test, connecting a temperature sensitive element, located in the electrolyte of one cell of the battery under test, in parallel with said voltmeter while said load is connected to the battery under test to automatically compensate the voltmeter reading for battery temperature; and causing the voltmeter reading to drop no more than a predetermined amount if the battery under test is good and to drop an amount greater than said predetermined amount if said battery is faulty, said predetermined amount being dependent upon the size of the battery being tested.

2. The improved method for detecting faulty storage batteries at various states of charge by measuring total battery voltage comprising the steps of connecting a no-load, high resistance, low current circuit including a selectively variable resistance in series with a voltmeter across the terminals of the battery under test; selectively adjusting said variable resistance to obtain a predetermined reading on the voltmeter; the adjusted position of said variable resistance indicating the relative state of charge of the battery under test; connecting a load of predetermined magnitude to the battery under test; connecting a temperature sensitive element, located in the electrolyte of one cell of the battery under test, in parallel with said voltmeter while said load is connected to the battery under test to automatically compensate the voltmeter reading for battery temperature; and causing the voltmeter reading to drop no more than a predetermined amount if the battery under test is good and to drop an amount greater than said predetermined amount if said battery is faulty, said predetermined amount being dependent upon the size of the battery being tested.

3. The improved method for detecting faulty storage batteries at various states of charge by measuring total battery voltage comprising the steps of connecting a no-load, high resistance, low current circuit including a selectively variable resistance and a voltmeter to the terminals of the battery under test; selectively adjusting said variable resistance to obtain a predetermined reading on the voltmeter; the adjusted position of said variable resistance indicating the relative state of charge of the battery under test; connecting a load of predetermined magnitude to the battery under test; connecting a thermistor, located in the electrolyte of one cell of the battery under test, in parallel with said voltmeter while said load is connected to the battery under test to automatically compensate the voltmeter reading for battery temperature; and causing the voltmeter reading to change by an amount no more than a predetermined amount if the battery under test is good and to change by an amount greater than said predetermined amount if said battery is faulty, said predetermined amount being dependent upon the size of the battery being tested.

4. The improved method for detecting faulty storage batteries at various states of charge by measuring total battery voltage comprising the steps of connecting a rheostat and a voltmeter to the terminals of the battery under test; adjusting said rheostat to obtain a predetermined reading on the voltmeter, the adjusted position of said variable resistance indicating the relative state of charge of the battery under test, connecting a load of predetermined magnitude to the battery under test; connecting a temperature sensitive element, located in the electrolyte of one cell of the battery under test, in circuit with said voltmeter while said load is connected to the battery under test to automatically compensate the voltmeter reading for battery temperature; and causing the voltmeter reading to drop no more than a predetermined amount if the battery under test is good and to drop an amount greater than said predetermined amount if said battery is faulty, said predetermined amount being dependent upon the size of the battery being tested.

5. The improvement of apparatus for detecting faulty storage batteries at various states of charge by measuring total battery voltage including the combination of a pair of terminals for connection to the battery to be tested; a voltage divider including at least two resistance portions connected across said terminals; a no-load circuit, including a selectively variable resistance calibrated to indicate relative charge in series with a voltmeter, connected between the junction of said two resistance portions and one of said terminals; a load circuit including a first normally open switch means in series with a load resistance, connected to said terminals; said load resistance being connected to said battery terminals upon closure of said first normally open switch means to place the battery under load; and a temperature sensitive element of a size sufficiently small to be placed in the electrolyte of one cell of the battery, connected in series with a second normally open switch means in parallel with the voltmeter, said second normally open switch means being operatively connected to said first normally open switch means for switch closing operation therewith to automatically compensate said voltmeter reading for battery temperature during the battery testing operation, and calibrations on said voltmeter indicative of permissible voltage drop under load of various size batteries.

6. The improvement of apparatus for detecting faulty storage batteries at various states of charge by measuring total battery voltage including the combination of a pair of terminals for connection to the battery to be tested, a voltage divider connected across said terminals; a no-load circuit including a selectively variable resistance in series with a voltmeter, connected to said voltage divider and one of said terminals, indicia cooperating with said variable resistance means to indicate relative charge of said battery; a load circuit including a first normally open switch means in series with a load resistance, connected to said terminals, said load resistance being connected to said battery terminals upon closure of said first normally open switch means to place the battery under load, and a temperature sensitive element of a size sufficiently small to be placed in the electrolyte of one cell of the battery, connected in series with a second normally open switch means in parallel with the voltmeter, said second normally open switch means being operatively connected to said first normally open switch means for switch closing operation therewith to automatically compensate said voltmeter reading for battery temperature during the battery testing operation.

7. The improvement of apparatus for detecting faulty storage batteries at various states of charge by measuring total battery voltage including the combination of a pair of terminals for connection to the battery to be tested; a no-load circuit including variable resistance means in circuit with a voltmeter connected to said terminals; indicia cooperating with said variable resistance means to indicate relative charge of said battery; a battery load and a normally open switch connected to said battery terminals, said battery load being connected to said terminals upon closure of said normally open switch to place the battery under load; a temperature sensitive element of a size sufficiently small to be placed in the electrolyte of one cell of the battery, and switch means for connecting said temperature sensitive element to said voltmeter when the battery is placed under load to automatically compensate said voltmeter reading for battery temperature during the battery testing operation.

8. The improvement of apparatus for detecting faulty storage batteries at various states of charge by measuring total battery voltage including the combination of a pair of terminals for connection to the battery to be tested; a no-load circuit including resistance means and a voltmeter connected to said terminals; means to selectively vary the resistance of said resistance means to prepare the voltmeter reading for the battery test; indicia cooperating with said last mentioned means to indicate relative charge of said battery; a battery load and a normally open switch connected to said battery terminals, said battery load being connected to said terminals upon closure of said normally open switch means to place the battery under load; a temperature sensitive element operatively associated with the battery under test and switch means for connecting said temperature sensitive element to said voltmeter, when the battery is placed under load to automatically compensate said voltmeter reading for battery temperature during the battery testing operation.

References Cited

UNITED STATES PATENTS

| | | | |
|---|---|---|---|
| 2,951,199 | 8/1960 | Dawkins | 324—29.5 |
| 2,979,650 | 4/1961 | Godshalk et al. | 324—29.5 X |
| 2,999,998 | 9/1961 | Barnes | 324—29.5 |
| 3,060,374 | 10/1962 | Strain | 324—30 X |

RUDOLPH V. ROLINEC, *Primary Examiner.*

WALTER L. CARLSON, *Examiner.*

C. F. ROBERTS, *Assistant Examiner.*